(12) United States Patent
Cafaro et al.

(10) Patent No.: US 12,448,112 B1
(45) Date of Patent: Oct. 21, 2025

(54) POWER GENERATION AND TRANSFER USING VARIABLE-PITCH PROPELLER

(71) Applicant: General Electric Company, Cincinnati, OH (US)

(72) Inventors: Stefan Joseph Cafaro, Chapel Hill, NC (US); Joel James Lau, Deerfield Township, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/802,246

(22) Filed: Aug. 13, 2024

(51) Int. Cl.
  *B64C 11/30* (2006.01)
  *B64D 31/06* (2024.01)
  *B64D 35/04* (2006.01)
  *B64D 41/00* (2006.01)

(52) U.S. Cl.
  CPC .............. *B64C 11/30* (2013.01); *B64D 31/06* (2013.01); *B64D 35/04* (2013.01); *B64D 41/007* (2013.01)

(58) Field of Classification Search
  CPC ......... B64C 11/30; B64C 35/04; B64D 31/06; B64D 31/09
  See application file for complete search history.

(56) References Cited

U.S. PATENT DOCUMENTS

| | | | |
|---|---|---|---|
| 4,936,748 A | 6/1990 | Adamson et al. | |
| 8,701,381 B2 | 4/2014 | Eames | |
| 9,664,070 B1 * | 5/2017 | Clauson | F02C 7/277 |
| 9,701,395 B2 | 7/2017 | Veilleux, Jr. et al. | |
| 10,526,975 B2 | 1/2020 | Howell et al. | |
| 10,618,667 B2 | 4/2020 | Keller et al. | |
| 10,662,875 B2 | 5/2020 | Lafargue et al. | |
| 11,454,195 B2 | 9/2022 | Niergarth et al. | |
| 11,850,951 B2 * | 12/2023 | Sawata | H02P 9/008 |
| 12,031,479 B2 * | 7/2024 | Hiett | B64D 31/12 |
| 2016/0023773 A1 | 1/2016 | Himmelmann et al. | |
| 2020/0215922 A1 * | 7/2020 | Sawata | H02P 9/14 |
| 2021/0039801 A1 | 2/2021 | Spierling et al. | |
| 2022/0063826 A1 * | 3/2022 | Hiett | F02C 7/262 |
| 2023/0095723 A1 | 3/2023 | Sibbach | |

* cited by examiner

*Primary Examiner* — Courtney D Heinle
*Assistant Examiner* — John S Hunter, Jr.
(74) *Attorney, Agent, or Firm* — Smith, Gambrell & Russell, LLP

(57) ABSTRACT

In one embodiment, a method includes determining a pitch value based on at least an energy goal. The energy goal may be at least one of bowed rotor motoring or an engine start. The method includes adjusting a pitch of a plurality of variable-pitch propeller blades based on the pitch value. The plurality of variable-pitch propeller blades are part of a variable-pitch propeller. The method includes, in response to a rotation of the plurality of variable-pitch propeller blades about a central axis based on the pitch of the plurality of variable-pitch propeller blades, activating an electric brake to reduce a speed of the rotation. The method further includes transferring electrical energy, generated by the electric brake reducing the speed of the rotation, to a component.

20 Claims, 7 Drawing Sheets

FIG. 6
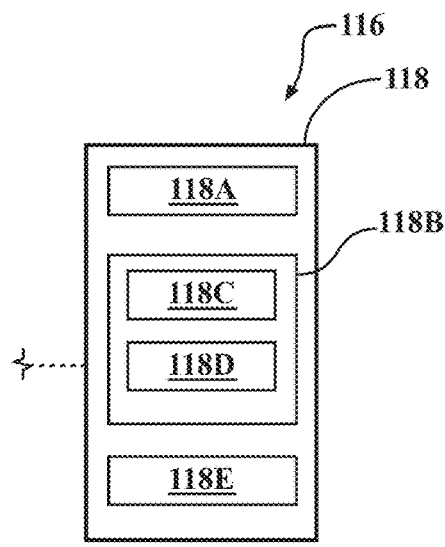
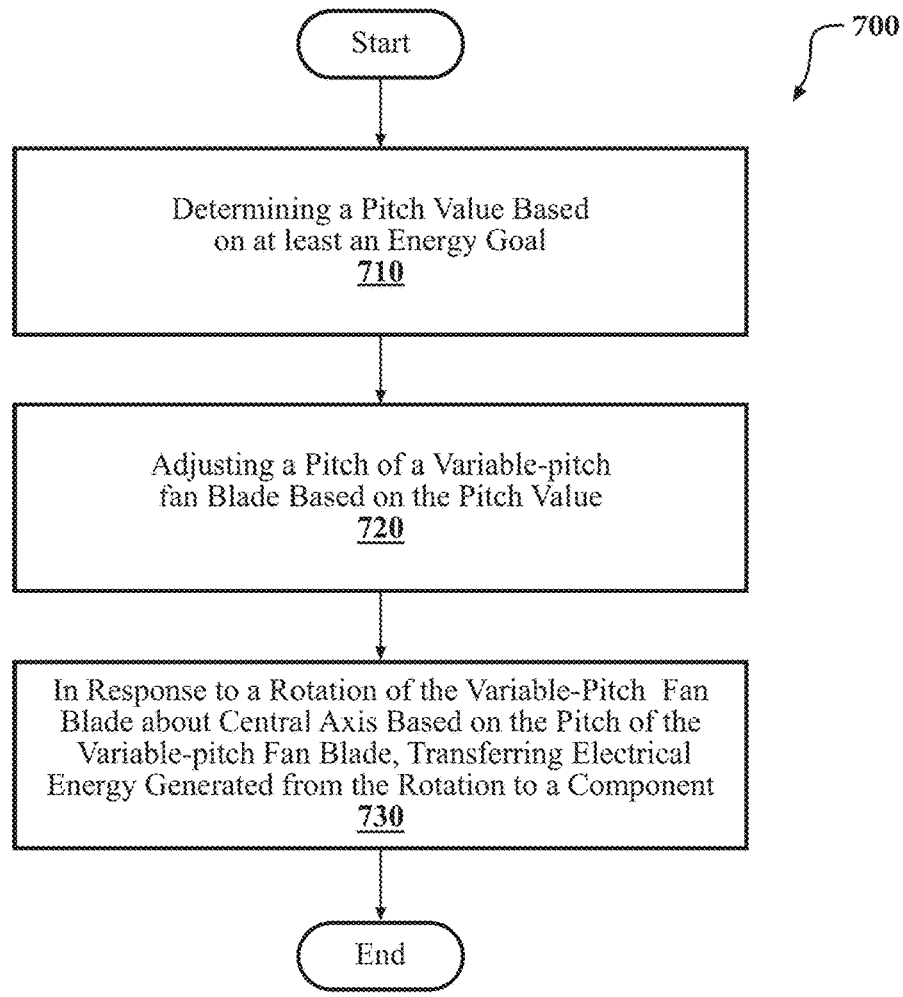
FIG. 7

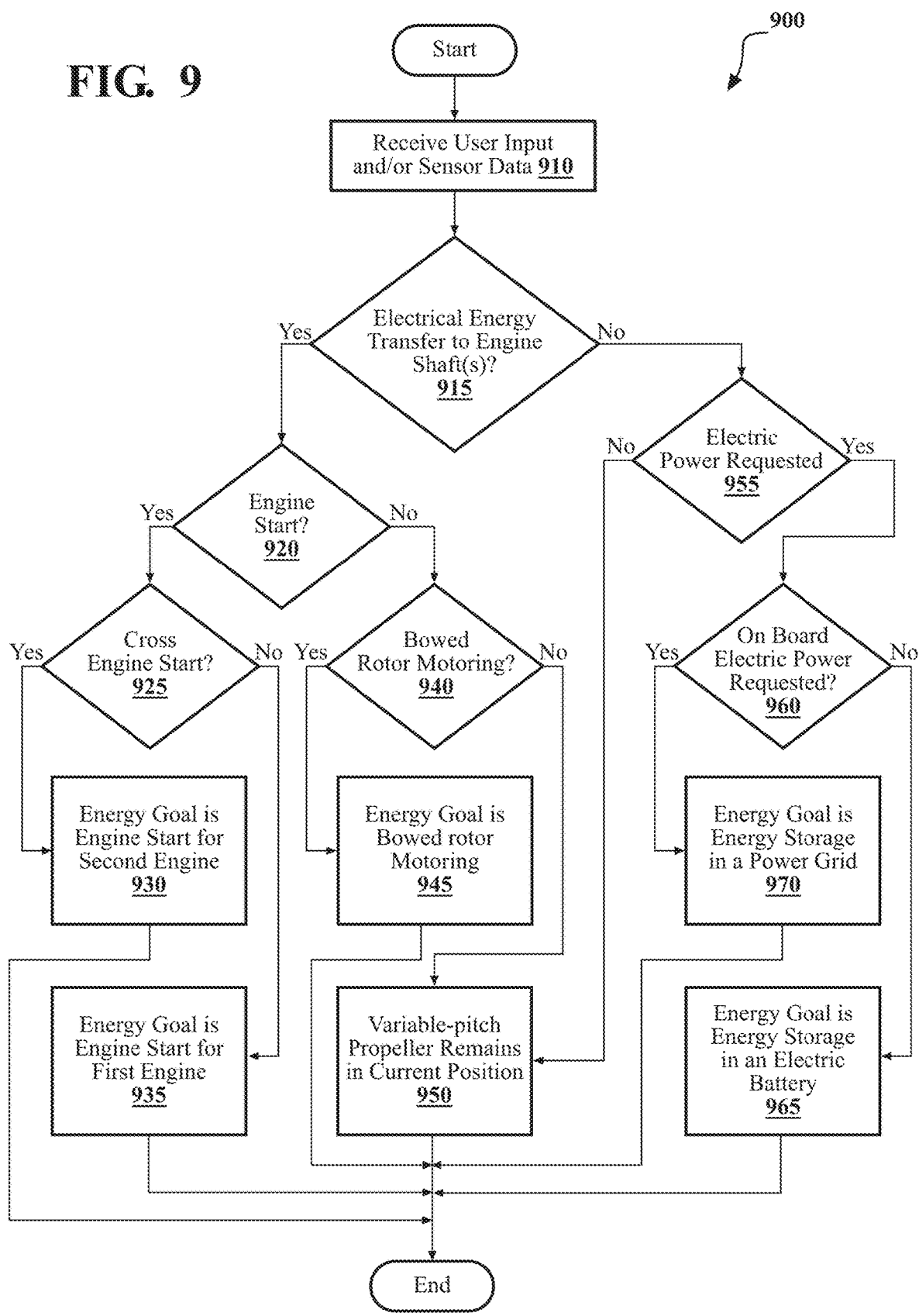

POWER GENERATION AND TRANSFER USING VARIABLE-PITCH PROPELLER

TECHNICAL FIELD

The subject matter described herein relates, in general, to systems and methods for generating power using a variable-pitch propeller and starting one or more engines using the generated power.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

Hybrid electric propulsion systems are being developed to improve an efficiency of conventional commercial aircraft. Various hybrid electric propulsion systems include an electric machine driven by one of the aircraft engines.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 is an example of a controller.

FIG. 7 is a flowchart of a method that is associated with one embodiment of generating electric energy and transferring the generated electrical energy.

FIG. 9 is another flowchart of a method that is associated with one embodiment of generating electric energy and transferring the generated electrical energy.

DETAILED DESCRIPTION

Figure 1:
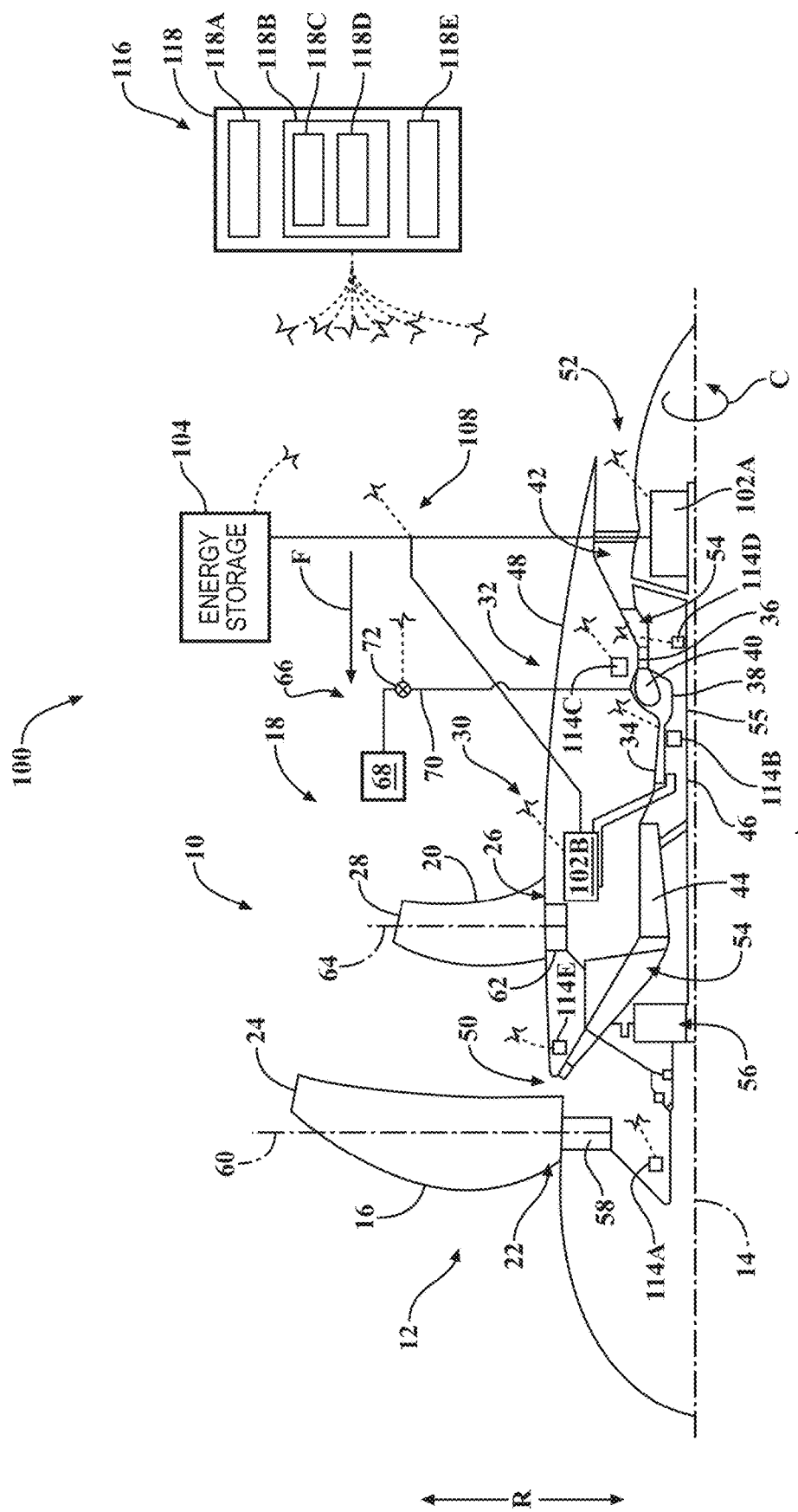
FIG. 1 is a schematic, cross-sectional view of a gas turbine engine in accordance with an exemplary embodiment of the present disclosure.

Systems, methods, and other embodiments associated with systems and methods for generating power using one or more variable-pitch propellers and starting one or more aircraft engines using the generated power are disclosed. An aircraft may have one or more engines, each including a variable-pitch propeller. A variable-pitch propeller includes a plurality of blades that have an adjustable pitch. As such an aircraft travels through the air, the one or more engines may be turned off and the variable-pitch propellers may maintain the pitch of the blades in a feathered position so as to reduce drag and maximize torque. At a certain instance, the aircraft may require the engines to be restarted. Current methods of restarting the engine(s) include utilizing an external power source such as an Auxiliary Power Unit (APU). However, this method requires acquiring and maintaining the external power source on the aircraft.

For an aircraft that is on the ground and stationary, the associated engines may experience a bowed rotor. This may occur due to a temperature difference within the engine. As an example, the temperature at the top portion of the engine may be higher than the temperature at the bottom portion of the engine. In a case where the temperature difference is significant, the components of the engine such as the low-pressure shaft and/or the high-pressure shaft may become deformed. This is known as bowed rotor. Current methods of preventing bowed rotor include bowed rotor motoring which also requires an external power source to power the variable-pitch propeller such that the variable-pitch propeller rotates at a low speed and dissipates the heat within the engine, as an example.

Accordingly, systems, methods, and other embodiments associated with restarting an aircraft engine, performing bowed rotor motoring, and/or generating electrical power using a variable-pitch propeller are disclosed. In one embodiment, the disclosed approach includes an aircraft having one or more engines. The aircraft may include an energy storage unit (e.g., an electric battery) coupled to the one or more engines. The engine may be a hybrid engine or a turbo engine, as an example. The engine includes a variable-pitch propeller which may be ducted or unducted. The engine may include a low-pressure shaft and a high-pressure shaft. The engine may further include one or more electric machines coupled to the low-pressure shaft and/or the high-pressure shaft. The electric machine includes a generator capable of converting kinetic energy or mechanical energy into electric energy. The electric machine is capable of transferring the electric energy to various components including the low-pressure shaft, the high-pressure shaft, an electric energy storage unit such as an electric battery which is onboard the aircraft, and/or a power grid which is not part of the aircraft. The engine may include an electric brake coupled to the variable-pitch propeller, the low-pressure shaft, and/or the high-pressure shaft.

The engine may include a controller. As an example, the controller may determine that an engine start is to be initiated based on user input and/or sensor data. The controller may further determine that the engine start is for a first engine that includes a first variable-pitch propeller and/or a second engine (or another engine). An engine start for the second engine (or the other engine) is known as a cross-engine start. As an example, with the aircraft in flight and in response to a determination of a cross-engine start, the controller may determine a pitch value based on the energy goal being an engine start as well as the environment (such as temperature, air speed, aircraft drag, etc.) and the characteristics of the aircraft. The controller may generate and utilize an algorithm to determine the pitch value. As an example, the controller may utilize a function based on characteristics of the aircraft and/or environmental conditions, a lookup table, and/or a feedback loop to determine the pitch value. The controller may utilize a lookup table to determine the pitch value. The controller may transmit a signal to the first variable-pitch propeller to adjust the pitch of the blades of the first variable-pitch propeller to the pitch value. In response, the first variable-pitch propeller adjusts the pitch of the blades such that the first variable-pitch propeller catches the ram air and begins to rotate. The low-pressure shaft is coupled with the variable-pitch propeller and so, the rotation of the variable-pitch propeller causes the low-pressure shaft to rotate. The generator in the electric machine is coupled to the low-pressure shaft and so, the rotation of the low-pressure shaft causes an armature in the generator to rotate, generating electrical energy. The controller may then transmit a signal to the electric machine to transmit the electrical energy to an electrical battery via an electric power bus. The controller may then transmit the electric machine on the second engine to retrieve electrical energy from the electrical battery and transfer the electrical energy to the engine and may utilize the electrical energy to start the second engine.

The embodiments disclosed herein present various advantages over conventional technologies. First, the embodiments are capable of restarting an engine without an external power source. Second, the embodiments are capable of generating and transferring electrical power from one engine to another engine. Third, the embodiments are capable of preventing a bowed rotor by performing bowed rotor motoring without using an external power source. Fourth, the embodiments are capable of generating and transmitting electrical energy to onboard electrical storage units and/or offboard electrical storage units.

In one embodiment, a method for generating, transferring, and utilizing electrical energy is disclosed. The method includes determining a pitch value based on at least an energy goal and adjusting a pitch of a plurality of variable-pitch propeller blades based on the pitch value. The plurality of variable-pitch propeller blades are part of a variable-pitch propeller. The method further includes, in response to a rotation of the plurality of variable-pitch propeller blades about a central axis based on the pitch of the plurality of variable-pitch propeller blades, transferring electrical energy generated from the rotation to a component.

In another embodiment, a system for generating, transferring, and utilizing electrical energy is disclosed. The system includes a variable-pitch propeller, a processor, and a memory in communication with the processor. The variable-pitch propeller has a plurality of variable-pitch propeller blades. The memory stores machine-readable instructions that, when executed by the processor, cause the processor to determine a pitch value based on at least an energy goal, adjust a pitch of the plurality of variable-pitch propeller blades based on the pitch value, and in response to a rotation of the plurality of variable-pitch propeller blades about a central axis based on the pitch of the plurality of variable-pitch propeller blades, transfer electrical energy generated from the rotation to a component.

In another embodiment, a non-transitory computer-readable medium for generating, transferring, and utilizing electrical energy is disclosed. The non-transitory computer-readable medium includes instructions that when executed by a processor cause the processor to determine a pitch value based on at least an energy goal, adjust a pitch of a plurality of variable-pitch propeller blades based on the pitch value, and in response to a rotation of the plurality of variable-pitch propeller blades about a central axis based on the pitch of the plurality of variable-pitch propeller blades, transfer the electrical energy generated from the rotation to a component. The plurality of variable-pitch propeller blades are part of a variable-pitch propeller.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Referring to FIG. 1, a cross-sectional view of an exemplary embodiment of an engine 10 is shown. More specifically, a cross-sectional view of a gas turbine engine is shown. The engine 10 may be a part of a hybrid-electric propulsion system of an aircraft. The engine 10 may configured as a single unducted rotor engine defining an axial direction A, a radial direction R, and a circumferential direction C. The engine 10 takes the form of an open rotor propulsion system and has a variable-pitch propeller 12 which includes a plurality or an array of variable-pitch propeller blades 16 arranged around a central longitudinal axis 14 of the engine 10.

The engine 10 may include a non-rotating vane assembly 18 positioned aft of the variable-pitch propeller 12 (i.e., non-rotating with respect to the central longitudinal axis 14), which may include an array of airfoils also disposed around central longitudinal axis 14, and more particularly, may include an array of vanes 20 disposed around the central longitudinal axis 14.

The variable-pitch propeller blades 16 may be arranged in typically equally spaced relation around the central longitudinal axis 14, and each variable-pitch propeller blade 16 has a root 22 and a tip 24 and a span defined therebetween. Similarly, the vanes 20 may also be arranged in typically equally spaced relation around the central longitudinal axis 14, and each has a root 26 and a tip 28 and a span defined therebetween.

Additionally, the gas turbine engine 10 may include a turbomachine 30 that has a core (also known as high-pressure/high-speed system) 32 and a low-pressure/low-speed system. It will be appreciated that as used herein, the terms "speed" and "pressure" are used with respect to the high-pressure/high-speed system and low-pressure/low-speed system interchangeably. Further, it will be appreciated that the terms "high" and "low" are used in this same context to distinguish the two systems and are not meant to imply any absolute speed and/or pressure values.

The core 32 may include a high-speed compressor 34, a high-speed turbine 36, and a high-speed shaft 38 extending therebetween and connecting the high-speed compressor 34 and high-speed turbine 36. The high-speed compressor 34, the high-speed turbine 36, and the high-speed shaft 38 may collectively be referred to as a high-speed spool of the gas turbine engine 10. Further, a combustion section 40 is located between the high-speed compressor 34 and high-speed turbine 36. The combustion section 40 may include one or more configurations for receiving a mixture of fuel and air and providing a flow of combustion gases through the high-speed turbine 36 for driving the high-speed spool.

The low-speed system similarly may include a low-speed turbine 42, a low-speed compressor or booster, 44, and a low-speed shaft 46 extending between and connecting the low-speed compressor 44 and low-speed turbine 42. The low-speed compressor 44, the low-speed turbine 42, and the low-speed shaft 46 may collectively be referred to as a low-speed spool 55 of the gas turbine engine 10.

Although the engine 10 is depicted with the low-speed compressor 44 positioned forward of the high-speed compressor 34, in certain embodiments the compressors 34, 44 may be in an interdigitated arrangement. Additionally, or alternatively, although the engine 10 is depicted with the high-speed turbine 36 positioned forward of the low-speed turbine 42, in certain embodiments the turbines 36, 42 may similarly be in an interdigitated arrangement.

The turbomachine 30 may be encased in a cowl 48. The cowl 48 may define at least in part an inlet 50 and an exhaust 52 and may include a turbomachinery flow path 54 extending between the inlet 50 and the exhaust 52. In one embodiment and as shown, the inlet 50 may be an annular or axisymmetric 360-degree inlet 50 located between the variable-pitch propeller 12 and the fixed or stationary vane assembly 18, and provides a path for incoming atmospheric air to enter the turbomachinery flow path 54 (and compressors 44, 34, combustion section 40, and turbines 36, 42) inwardly of the guide vanes 20 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18 and/or arranged in a non-axisymmetric manner.

The variable-pitch propeller 12 may be driven by the turbomachine 30, and more specifically, may be driven by the low-speed spool 55. The engine 10 as shown, may include a power gearbox 56, and the variable-pitch propeller 12 may be driven by the low-speed spool 55 of the turbomachine 30 across the power gearbox 56. As such, the variable-pitch propeller blades 16 of the variable-pitch propeller 12 may rotate around the central longitudinal axis 14 and generate thrust to propel engine 10, and hence an aircraft to which it is associated, in a forward direction F. For example, in certain embodiments, one or more engines configured in a manner similar to the exemplary engine 10 depicted in FIG. 1 may be incorporated into and utilized with the aircraft.

The power gearbox 56 may include a gearset for decreasing a rotational speed of the low-speed spool 55 relative to the low-speed turbine 42, such that the variable-pitch propeller 12 may rotate at a slower rotational speed than the low-speed spool 55.

As briefly mentioned above the engine 10 includes a vane assembly 18. The vane assembly 18 extends from the cowl 48 and is positioned aft of the variable-pitch propeller 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the variable-pitch propeller 12 is located forward of the turbomachine 30 in a "puller" configuration, and the exhaust 52 is located aft of the guide vanes 20. As will be appreciated, the vanes 20 of the vane assembly 18 may be configured for straightening out an airflow (e.g., reducing a swirl in the airflow) from the variable-pitch propeller 12 to increase an efficiency of the engine 10. For example, the vanes 20 may be sized, shaped, and configured to impart a counteracting swirl to the airflow from the variable-pitch propeller blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the variable-pitch propeller blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the variable-pitch propeller blades 16, or to provide a thrust reversing feature which may be useful in certain operating conditions such as upon landing an aircraft, or to desirably adjust acoustic noise produced at least in part by the variable-pitch propeller blades 16, the vanes 20, or aerodynamic interactions from the variable-pitch propeller blades 16 relative to the vanes 20. More specifically, for the embodiment of FIG. 1, the variable-pitch propeller 12 is depicted with a pitch change mechanism 58 for rotating the variable-pitch propeller blades 16 about their respective pitch axes 60, and the vane assembly 18 is depicted with a pitch change mechanism 62 for rotating the vanes 20 about their respective pitch axes 64.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc.; a direct-drive configuration (i.e., may not include the gearbox 56); etc. For example, in other exemplary embodiments, the engine 10 may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally, or alternatively, in other exemplary embodiments, any other suitable gas turbine engine may be provided. For example, in other exemplary embodiments, the gas turbine engine may be a turboshaft engine, a turboprop engine, turbojet engine, etc. Moreover, for example, although the engine 10 is depicted as a single unducted rotor engine, in other embodiments, the engine 10 may include a multi-stage open rotor configuration, and aspects of the disclosure described hereinbelow may be incorporated therein.

The hybrid electric propulsion system may include a fuel delivery system 66. The fuel delivery system 66 generally includes a fuel source 68 (which may be, e.g., a fuel tank of an aircraft including the engine 10), one or more fuel lines 70 extending between the fuel source 68 and the combustion section 40 of the engine 10, and a fuel valve 72. The fuel valve 72 is in fluid communication with the one or more fuel lines 70, configured to regulate a fuel flow through the one or more fuel lines 70 from the fuel source 68 to the combustion section 40. The fuel valve 72 may be referred to as, or configured as part of, a fuel metering unit ("FMU"), and may generally control a power output of the engine 10.

Moreover, it will be appreciated that the engine 10 is integrated with an electric power system 100. The electric power system 100 generally includes an electric machine 102A, 102B coupled to at least one of the high-pressure system (or core 32) or the low-pressure system, and an energy storage unit 104.

Further, for the embodiment shown, the electric power system 100 includes an electric power bus 108 electrically connecting the various components of electric power system 100. The electric power bus 108 may be, e.g., one or more electrical lines arranged in any suitable configuration.

Further, still, for the embodiment shown, the electric machine 102A of the electric power system 100 is a low-pressure (LP) electric machine 102A coupled to the low-pressure system of the engine 10. More specifically, for the embodiment shown, the LP electric machine 102A is embedded within the engine 10, at a location within or aft of the turbine section of the engine 10, and inward of the core airflow path 54 through the engine 10 along the radial direction R. It will be appreciated, however, that in other example embodiments, the LP electric machine 102A may additionally, or alternatively, be configured in the other suitable manner. For example, in other embodiments, the LP electric machine 102A may be embedded within a compressor section of the engine 10, may be located outward of core airflow path 54 along the radial direction R (and, e.g., within the cowl 48), etc.

Moreover, for the embodiment shown, the LP electric machine 102A is not the only electric machine 102A of the electric power system 100 integrated with the engine 10. More specifically, the electric power system 100 further includes a high-pressure (HP) electric machine 102B coupled to the high-pressure system/core 32 of the engine 10, and in electrical communication with the electric power bus 108. The HP electric machine 102B is, for the embodiment shown, also embedded within the engine 10 at a location inward of the core airflow path 54. However, for the embodiment shown, the HP electric machine 102B is located within the compressor section of the engine 10. It will be appreciated that in other embodiments, the HP electric machine 102B may alternatively be positioned outward of the core airflow path 54 along the radial direction R, driven through, e.g., a geared connection. For example, in certain embodiments, the HP electric machine 102B may be coupled to an accessory gearbox (not shown), which is in turn coupled to the high-pressure system 32 of the engine 10.

In at least certain exemplary embodiments, the energy storage unit 104 may include one or more batteries. Additionally, or alternatively, the energy storage unit 104 may include one or more supercapacitor arrays, one or more ultracapacitor arrays, or both. In at least certain embodiments, the energy storage unit 104 may be configured to provide at least 5 kilowatts (kW) of energy to the electric power system 100, such as at least 50 kW, such as at least 50 kW, such as at least 250 KW, such as at least 300 kW, such as at least 350 KW, such as at least 400 kW, such as at least 500 kW, such as up to 5 megawatts (MW), such as up to 10 megawatts (MW). Further, the energy storage unit 104 may be configured to provide such electrical power for at least two minutes, such as at least three minutes, such as at least five minutes, such as up to an hour.

The exemplary electric power system 100 is operably connected to a controller 116. The controller 116 may be an engine controller for the engine 10 (e.g., a Full Authority Digital Engine Control controller), may be an aircraft controller, may be a controller dedicated to the electric power system 100, etc. The controller 116 may be configured to receive data indicative of various operating conditions and parameters of the engine 10 during operation of the engine 10. For example, the engine 10 includes one or more sensors 114A, 114B, 114C, 114D, 114E configured to sense data indicative of various operating conditions and parameters of the engine 10, such as rotational speeds, temperatures, pressures, vibrations, etc. More specifically, however, for the exemplary embodiment depicted in FIG. 1, the one or more sensors 114A, 114B, 114C, 114D, 114E include a first speed sensor 114A configured to sense data indicative of one or more parameters of the variable-pitch propeller 12 (e.g., rotational speed, acceleration, torque on the rotor shaft driving the variable-pitch propeller 12, etc.); a second sensor 114B configured to sense data indicative of the high-pressure system (such as a rotational speed of high-pressure spool 38, a compressor exit temperature, etc.); a third sensor 114C configured to sense data indicative of one or combustion section parameters (such as a temperature within the combustion section 40, a fuel flow to the combustion section 40, one or more pressures within or around the combustion section 40, etc.), one or more high-pressure turbine parameters (such as turbine inlet temperature, a rotational speed of the high-pressure turbine 36, etc.), or both; a fourth sensor 114D operable to sense data indicative of one or more parameters of the low-pressure system (such as a rotational speed of the low-pressure spool 55); and a fifth sensor 114E configured to sense data indicative of one or more variable geometry components (such as a position of one or more variable inlet guide vanes, outlet guide vanes, variable-pitch propeller blades 16, guide vanes 20, etc.). In addition to receiving sensor data from sensors in the engine(s), the controller 116 may be configured to receive sensor data from other sensors such as other aircraft sensors or ground station sensors, as well as any other relevant information from the aircraft and/or ground station such as environment conditions including weather, temperature, air speed, air traffic, and heading.

Figure 2:
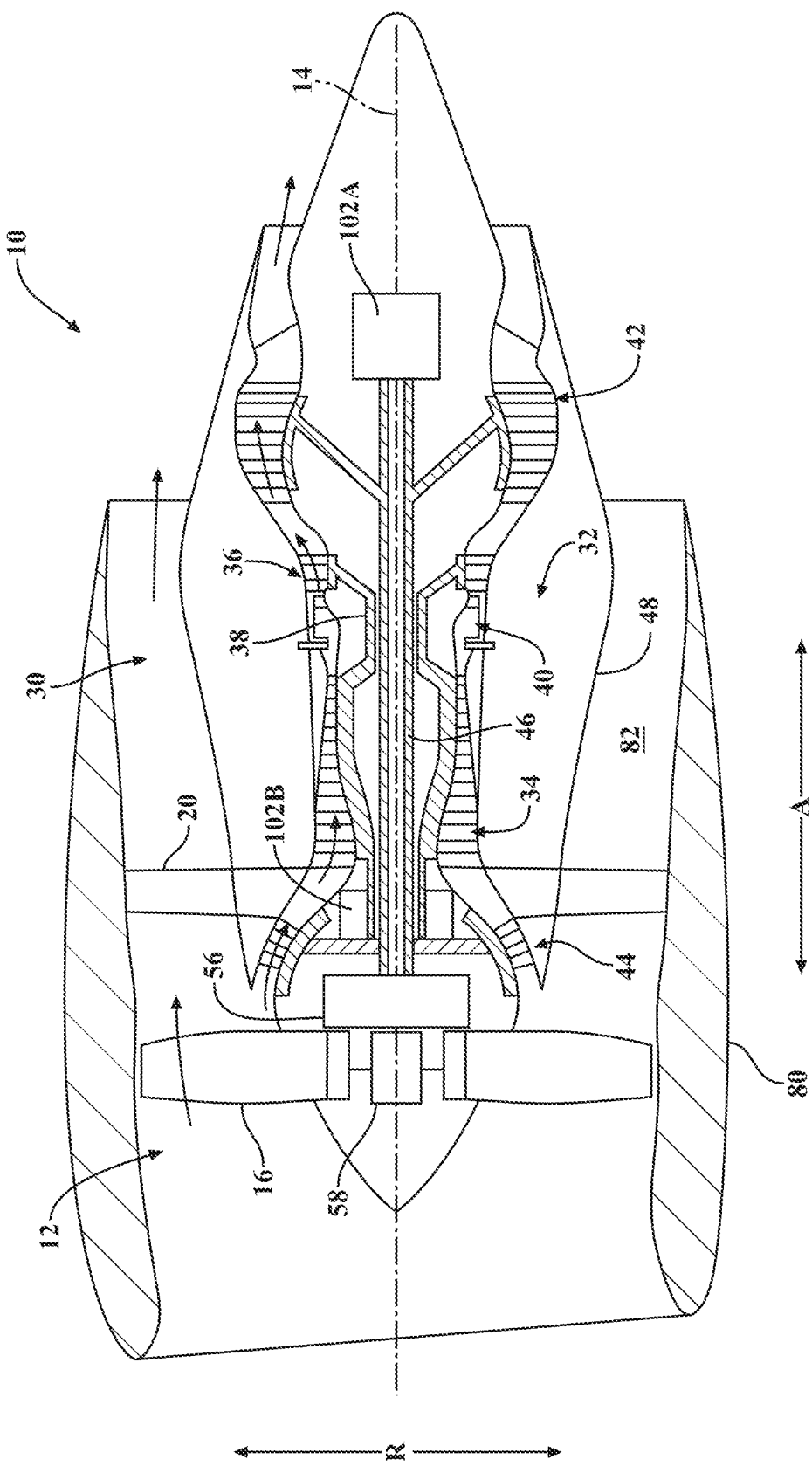
FIG. 2 is a schematic, cross-sectional view of a gas turbine engine in accordance with another exemplary embodiment of the present disclosure.

Referring to FIG. 2, an engine 10 in accordance with another exemplary embodiment of the present disclosure is depicted. As an example, the engine 10 may be configured as a ducted turbofan engine. The exemplary embodiment of FIG. 2 may be configured in substantially the same manner as the exemplary engine 10 described above with respect to FIG. 1, and the same or similar reference numerals may refer to the same or similar parts. However, as will be appreciated, for the embodiment shown, the engine 10 further includes a nacelle 80 circumferentially surrounding at least in part, the variable-pitch propeller 12 and turbomachine 30, defining a bypass passage 82 therebetween. It will be appreciated that in other exemplary embodiments of the present disclosure, a hybrid electric propulsion may be provided including multiple engines similar to the gas turbine engines described above with reference to FIG. 1, FIG. 2, or both. The multiple engines may include electric machines that are in electrical communication with a common electric communication bus.

Figure 3:
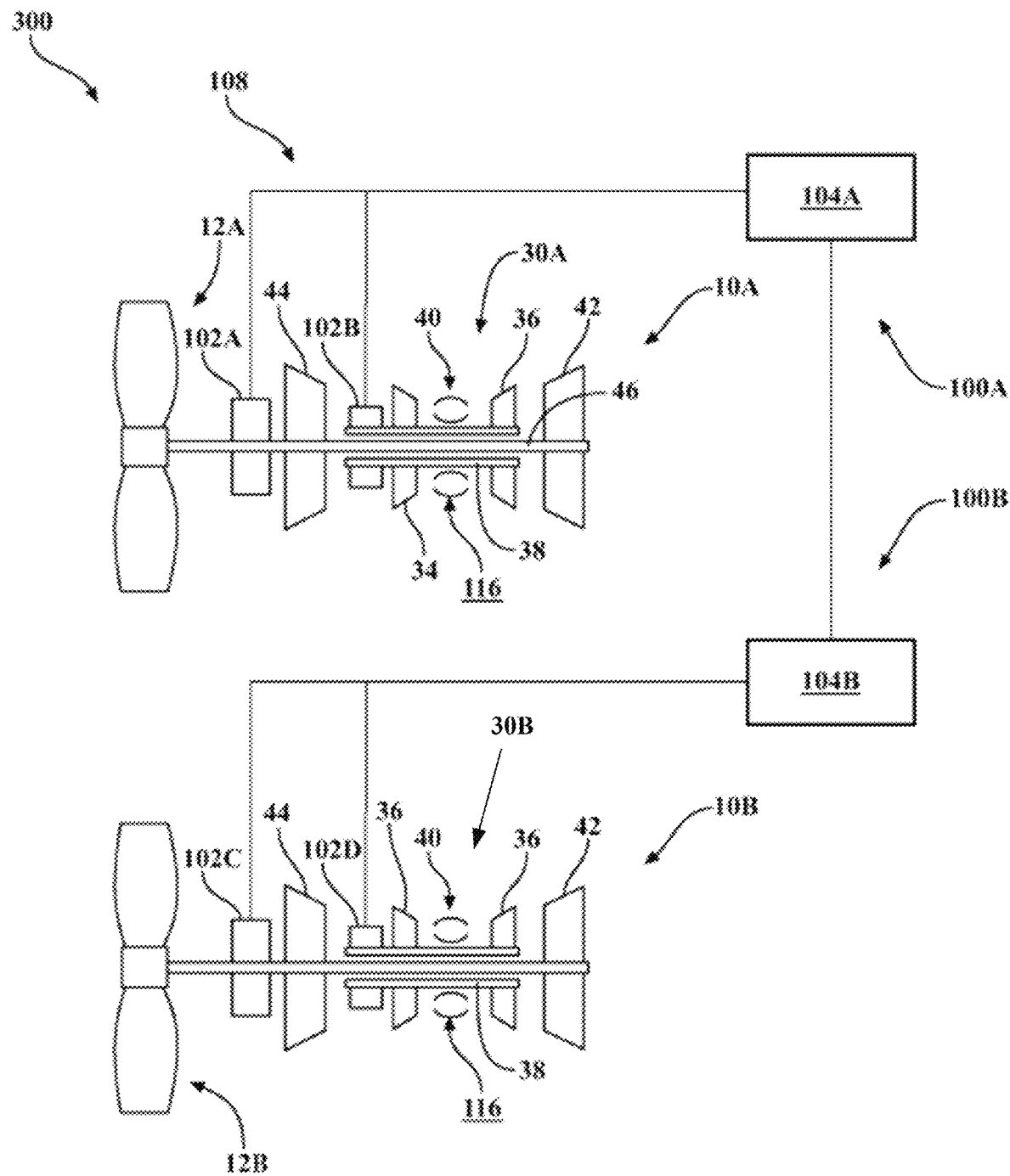
FIG. 3 is a schematic view of a propulsion system in accordance with another exemplary embodiment of the present disclosure.

Referring to FIG. 3, a hybrid-electric propulsion system 300 is shown. The hybrid-electric propulsion system 300 may include a plurality of engines 10A, 10B. As an example and as shown, the hybrid electric propulsion system 300 may include a first engine 10A and a second engine 10B. The first engine 10A generally includes a first turbomachine 30A and a first variable-pitch propeller 12A, and similarly, the second engine 10B generally includes a second turbomachine 30B and a second variable-pitch propeller 12B. Each of the first and second turbomachines 30A, 30B generally includes a low-pressure system having a low-pressure compressor 44 drivingly coupled to a low-pressure turbine 42 through a low-pressure shaft 46, as well as a high-pressure system having a high-pressure compressor 34 drivingly coupled to a high-pressure turbine 36 through a high-pressure shaft 38. Additionally, the first variable-pitch propeller 12A is drivingly coupled to the low-pressure system of the first turbomachine 30A and the second variable-pitch propeller 12B is drivingly coupled to the low-pressure system of the second turbomachine 30B. In certain exemplary embodiments, the first variable-pitch propeller 12A and first turbomachine 30A may be configured as a first turbofan engine and similarly, the second variable-pitch propeller 12B and second turbomachine 30B may be configured as a second turbofan engine. Alternatively, however, these components may instead be configured as parts of a turboprop engine or any other suitable turbomachine-driven propulsion device. Further, in certain exemplary embodiments, the first engine 10A may be mounted to a first wing of an aircraft and the second engine 10B may be mounted to a second wing of the aircraft. However, in other exemplary embodiments, any other suitable configuration may be provided (e.g., both may be mounted to the same wing, one or both may be mounted to a tail of the aircraft, etc.).

The hybrid electric propulsion system 300 may include one or more electric systems. As an example, the hybrid electric propulsion system 300 may include a first electric system 100A and a second electric system 100B. Each of the electric systems 100A, 100B may include one or more electric machines and one or more energy storage units. As an example and as shown, the first electric system 100A may include a first electric machine 102A, a second electric machine 102B, and a first electric energy storage unit 104A electrically connectable to the first electric machine 102A and second electric machine 102B. The second electric system 100B may include a third electric machine 102C, a fourth electric machine 102D, and a second electric energy storage unit 104B electrically connectable to the third electric machine 102C and the fourth electric machine 102D.

Each of the electric machines 102A, 102B, 102C, 102D may include a generator (not shown). The generator may generate electrical power from mechanical power. In other words, the generator may generate electric energy from kinetic energy. As an example, the generator may include an armature and a plurality of magnets forming a magnetic field around the armature. The armature is capable of rotating within the plurality of magnets and electricity is generated by the rotation of the armature in the magnetic field. The generator may be alternating current (AC) or direct current (DC) generator.

The first electric machine 102A may be coupled to the first variable-pitch propeller 12A of and is further coupled to the low-pressure system of the first turbomachine 30A. More specifically, the first electric machine 102A may be coupled to the low-pressure spool 46 of the first turbomachine 30A. As such, the armature of the generator in the first electric machine 102A may be coupled to the low-pressure spool 46 such that as the low-pressure spool 46 rotates, the armature rotates, and the rotation creates electrical power.

The second electric machine 102B may be coupled to the first turbomachine 30A. More specifically, for the embodiment depicted, the second electric machine 102B may be coupled to the high-pressure system of the first turbomachine 30A, and more specifically still, may be coupled to the high-pressure spool 38 of the first turbomachine 30A. As such, the armature of the generator in the second electric machine 102B may be coupled to the high-pressure spool 38 such that as the high-pressure spool 38 rotates, the armature rotates, and the rotation creates electrical power. The coupling could be based on a gear system and/or a belt system.

The third electric machine 102C may be coupled to the second variable-pitch propeller 12B and is further coupled to the low-pressure system of the second turbomachine 30A. More specifically, the third electric machine 102C may be coupled to the low-pressure spool 46 of the second turbomachine 30B. As such, the armature of the generator in the third electric machine 102C may be coupled to the low-pressure spool 46 such that as the low-pressure spool 46 rotates, the armature rotates, and the rotation creates electrical power. The coupling could be based on a gear system and/or a belt system.

The fourth electric machine 102D may be coupled to the second turbomachine 30B. More specifically, for the embodiment depicted, the fourth electric machine 102D may be coupled to the high-pressure system of the second turbomachine 30B, and more specifically still, may be coupled to the high-pressure spool 38 of the first turbomachine 30A. As such, the armature of the generator in the fourth electric machine 102D may be coupled to the high-pressure spool 38 such that as the high-pressure spool 38 rotates, the armature rotates, and the rotation creates electrical power.

As such, the first electric machine 102A and the second electric machine 102B may extract power from the low-pressure system and the high-pressure system of the first turbomachine 30A, respectively, using as an example, the generator. Similarly, the third electric machine 102C and the fourth electric machine 102D may extract power from the low-pressure system and the high-pressure system of the second turbomachine 30B, respectively, using as an example, the generator The electric machines 102A, 102B, 102C, 102D may provide electrical power generated by the generator to one or more of the low-pressure system and high-pressure system of the first turbomachine 30A, low-pressure system and high-pressure system of the second turbomachine 30B, and/or a component such as an electric energy storage unit, e.g., an electric battery or a power grid. As such, in certain exemplary aspects, the electric machines 102A, 102B, 102C, 102D may drive, or assist with driving the variable-pitch propellers 12A, 12B.

The electric energy storage unit 104A, 104B may be any component capable of receiving, storing, and redistributing electric power between various components. As an example, the electric energy storage unit 104A, 104B may be an electric battery that is onboard the aircraft and/or a power grid which may not be a part of the aircraft.

The exemplary hybrid electric propulsion system 300 further includes a controller 116 and a power bus 108. The electric machines 102A, 102B, 102C, 102D and the electric energy storage units 104A, 104B are each electrically connectable to one another through the power bus 108. For example, the power bus 108 may include various switches or other power electronics movable to selectively electrically connect the various components of the hybrid electric propulsion system, and optionally to convert or condition such electrical power transferred therethrough.

Furthermore, it should be appreciated that in still other exemplary embodiments, the exemplary hybrid electric propulsion system 300 may have other suitable configurations. For example, in other exemplary embodiments, each engine 10A, 10B may include one electric machine 102A, 102B, 102C, 102D, where the electric machine 102A, 102B, 102C, 102D is coupled to one of the low-pressure system or the high-pressure system. Further, the electric machine 102A, 102B, 102C, 102D may be located in any suitable position such as being embedded within the respective engine 10A, 10B (e.g., located inward of a core air flowpath through the engine 10A, 10B along a radial direction of the respective engine 10A, 10B) or being located outward of the core air flowpath along the radial direction (e.g., within an under-cowl area of the engine 10A, 10B).

As previously mentioned, the exemplary hybrid electric propulsion system 300 may include one or more controllers 116. As an example, the hybrid electric propulsion system 300 may include one controller 116 for controlling one or more engines. As another example, the hybrid electric propulsion system 300 may include two or more controllers 116 where each controller 116 controls a different engine 10A, 10B. As shown, a single controller 116 may control multiple engines 10A, 10B.

Figure 4:
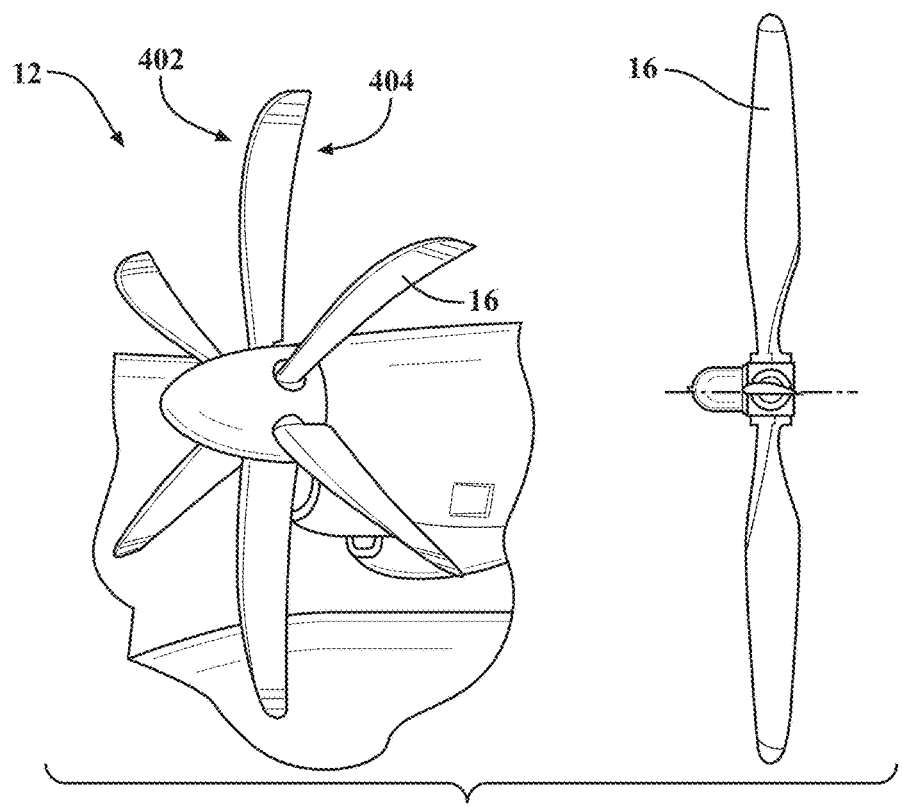
FIG. 4 is an example of a variable-pitch propeller blade in a feathered position.

Referring to FIG. 4, an example of a variable-pitch propeller 12 in a feathered position is shown. The variable-pitch propeller 12 may be a portion of an engine 10 of an aircraft such as a gas turbine engine or a gas and electric hybrid engine. The variable-pitch propeller 12 includes a plurality of variable-pitch propeller blades 16. Variable-pitch propeller blades 16 can vary the pitch of the variable-pitch propeller blades 16 by each variable-pitch propeller blade 16 rotating around the long axis of the respective variable-pitch propeller blade 16. As previously mentioned, and as shown, the variable-pitch propeller blades 16 are in the feathered position. In the feathered position, the leading edge 402 and the trail edge 404 of each variable-pitch propeller blade are parallel to a flight path of the aircraft. As such, the variable-pitch propeller blades 16 are about 90 degrees to the plane of rotation. In the feathered position, the variable-pitch propeller 12 minimizes drag on the aircraft and limits propeller rotation. The pitch of the variable-pitch propeller 12 may be adjusted manually by a user such as a pilot or may be adjusted automatically by a controller 116.

Figure 5:
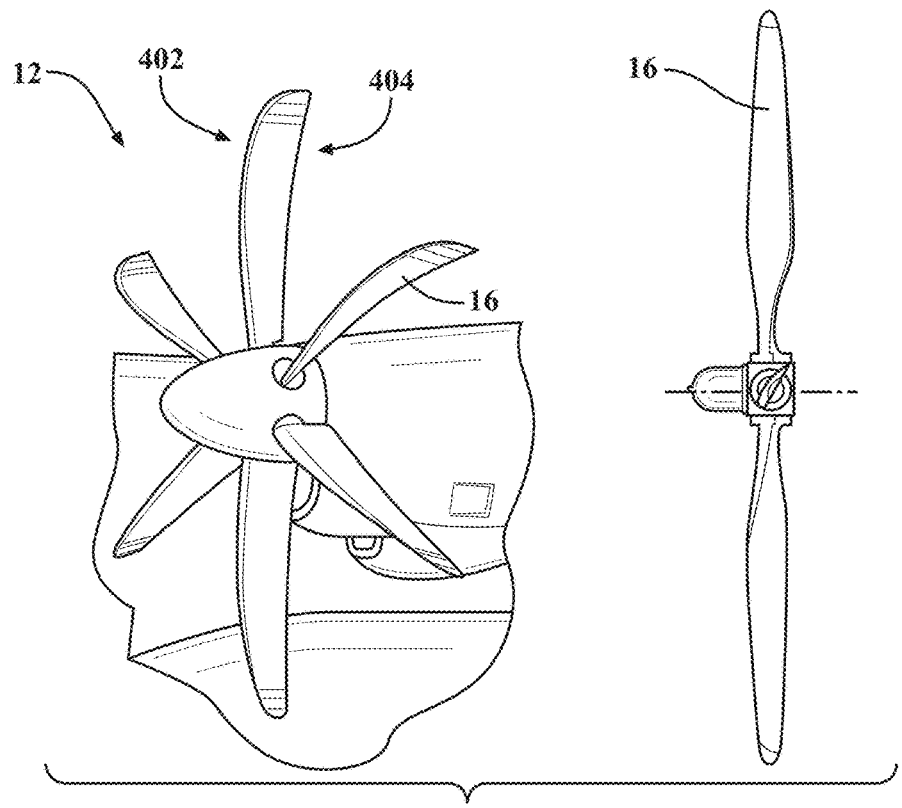
FIG. 5 is an example of the variable-pitch propeller blade in a non-feathered position.

Referring to FIG. 5, an example of the variable-pitch propeller 12 in a non-feathered position is shown. As such, the variable-pitch propeller blades 16 are in the non-feathered position. More specifically and as shown, the variable-pitch propeller blades 16 may be in a high pitch position, where the variable-pitch propeller blades 16 are about 45 degrees to the plane of rotation. Alternatively, the variable-pitch propeller blades 16 may be in a low pitch position, where the variable-pitch propeller blades are about 20 degrees to the plane of rotation. At the high pitch position, the variable-pitch propeller blades 16 rotate at a faster rate while at the low pitch position, the variable-pitch propeller blades 16 rotate at a slower rate.

Referring to FIG. 6, an example of the controller 116 is shown. The controller 116 may include one or more computing device(s) 118. The computing device(s) 118 can include one or more processor(s) 118A and one or more memory device(s) 118B.

The one or more processor(s) 118A can include any suitable processing device, such as a microprocessor, microcontroller, integrated circuit, logic device, and/or other suitable processing device) that is configured to implement functions associated with a control module 118C. In general, the one or more processor(s) 118A may be an electronic processor, such as a microprocessor, which is capable of performing various functions as described herein. The control module 118C is, for example, computer-readable instructions that, when executed by the processor 118A, cause the processor 118A to perform the various functions disclosed herein. In further arrangements, the control module 118C is a logic, integrated circuit, or another device for performing the noted functions that includes the instructions integrated therein.

The one or more memory device(s) 118B can include one or more computer-readable media, including, but not limited to, non-transitory computer-readable media, random-access memory (RAM), read-only memory (ROM), hard drives, flash drives, and/or other memory devices. The one or more memory device(s) 118B can store information accessible by the one or more processor(s) 118A, such as the control module 118C which includes computer-readable instructions that can be executed by the one or more processor(s) 118A. The control module 118C can be any set of instructions that when executed by the one or more processor(s) 118A, cause the one or more processor(s) 118A to perform operations. In some embodiments, the instructions associated with the control module 118C can be executed by the one or more processor(s) 118A to cause the one or more processor(s) 118A to perform operations, such as any of the operations and functions for which the controller 116 and/or the computing device(s) 118 are configured, the operations for operating an electric power system 100 (e.g., method 700), as described herein, and/or any other operations or functions of the one or more computing device(s) 118. The instructions associated with the control module 118C may be software written in any suitable programming language or can be implemented in hardware. Additionally, and/or alternatively, the instructions associated with the control module 118C can be executed in logically and/or virtually separate threads on processor(s) 118A.

The memory device(s) 118B can include a data store 118D for storing data that can be accessed by the processor(s) 118A. For example, the data can include data indicative of power flows, data indicative of engine 10/aircraft operating conditions, and/or any other data and/or information described herein. The data store 118D is, in one arrangement, an electronic data structure stored in the memory device(s) 118B or another data store, and that is configured with routines that can be executed by the one or more processor(s) 118A for analyzing stored data, providing stored data, organizing stored data, and so on. Thus, in one embodiment, the data store 118D stores data used by the control module 118C in executing various functions. While the computing device(s) 118 is illustrated as including the various data elements, it should be appreciated that one or more of the illustrated data elements may not be included within the data store 118D in various implementations and may be included in a data store that is external to the computing device(s) 118. In any case, the computing device(s) 118 stores various data elements in the data store 118D to support functions of the control module 118C.

The computing device(s) 118 can also include a network interface 118E used to communicate, for example, with the other components of the engine 10, the aircraft incorporating the engine 10, the electric power system 100, etc. For example, in the embodiment depicted, as noted above, the engine 10 includes one or more sensors 114A, 114B, 114C, 114D, 114E for sensing data indicative of one or more parameters of the engine 10 and various accessory systems, and the electric power system 100 includes an energy storage unit 104, an LP electric machine 102A, an HP electric machine 102B, and an auxiliary power unit. The controller 116 is operably coupled to these components through, e.g., the network interface 118E, such that the controller 116 may receive data indicative of various operating parameters sensed by the one or more sensors 114A, 114B, 114C, 114D, 114E during operation, various operating conditions of the components, etc., and further may provide commands to control electrical flow of the electric power system 100 and other operating parameters of these systems, e.g., in response to the data sensed by the one or more sensors 114A, 114B, 114C, 114D, 114E and other conditions.

The network interface 118E can include any suitable components for interfacing with one or more network(s), including for example, transmitters, receivers, ports, controllers, antennas, and/or other suitable components. For example, in the embodiment shown, the network interface 118E is configured as a wireless communication network wirelessly in communication with these components (as is indicated by the dashed communication lines in FIG. 1).

The technology discussed herein makes reference to computer-based systems and actions taken by and information sent to and from computer-based systems. One of ordinary skill in the art will recognize that the inherent flexibility of computer-based systems allows for a wide variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

In one embodiment, the control module 118C includes instructions that, when executed by the processor(s) 118A, cause the processor(s) 118A to determine a pitch value based on at least an energy goal. The control module 118C may receive user input such as an input from a user, e.g., a pilot. The user input may include information about the energy goal, environmental conditions, and/or characteristics of the aircraft. The control module 118C may receive sensor data and may determine from the sensor data, the energy goal, the environmental conditions, and/or the characteristics of the aircraft. As an example, the energy goal may be one of bowed rotor motoring, an engine start, or energy storage. In an example where the energy goal is bowed rotor motoring, the user may input that the energy goal is bowed rotor motoring. Additionally and/or alternatively, the control module 118C may receive sensor data indicating that the aircraft is on ground and the aircraft is stationary. The control module 118C may also receive sensor data indicating that components in the engine 10 are deformed due to temperature differences around the components. In response to the user input setting the energy goal to bowed rotor motoring and/or the sensor data including the aforementioned conditions, the control module 118C may initiate a process associated with the energy goal being bowed rotor motoring. Similarly, the user may input that the energy goal is an engine start. The control module 118C may receive this user input and initiate the process associated with energy goal being an engine start. The control module 118C may receive sensor data or aircraft status data indicating that an engine start is needed. As an example, an upcoming instruction for the aircraft to ascend may require an engine that is currently turned off to be re-started. In general, in response to an upcoming action of the aircraft that requires re-starting the engine, the control module 118C may initiate the process associated with the energy goal being an engine start. Similarly, the user may input that the energy goal is energy storage. The control module 118C may receive this user input and initiate the process associated with the energy goal being energy storage. The control module 118C may receive sensor data, aircraft status data, an electric battery status, and/or a power grid status indicating that energy storage is needed. As an example, the aircraft status data may indicate that energy storage is needed, the electric battery status may indicate that the energy level of the electric battery is low and energy storage is needed, and/or the power grid status may indicate that the energy level of the power grid is low and energy storage is needed. In response to sensor data or energy levels as previously mentioned, the control module 118C may initiate the process associated with the energy goal being energy storage.

The control module 118C may determine a pitch value based on at least the energy goal. As such, the control module 118C may determine a rate of rotation for the variable-pitch propeller. The control module 118C may then determine the pitch value such that the variable-pitch propeller may achieve the determined rate of rotation. In addition to the rate of rotation, the control module 118C may determine the pitch value based on environmental conditions such as weather conditions, e.g., temperature, humidity, air speed, and/or precipitation. Also in addition, the control module 118C may determine the pitch value based on characteristics of the aircraft. The aircraft includes the turbo engine 10 that includes the variable-pitch propeller 12.

The control module 118C may utilize any suitable algorithm to determine the pitch value based on the determined rate of rotation, the environmental conditions, and/or the characteristics of the aircraft. As an example, the control module 118C may utilize a lookup table to determine the pitch value based on the aforementioned conditions.

In one embodiment, the control module 118C includes instructions that, when executed by the processor(s) 118A, cause the processor(s) 118A to adjust a pitch of the variable-pitch propeller blade 16 based on the pitch value. As an example, after the control module 118C has determined the pitch value, the control module 118C may transmit a signal, such as an electronic signal, to the variable-pitch propeller 12, instructing the variable-pitch propeller 12 to adjust the pitch of the variable-pitch propeller blades 16 to the determined pitch value. In response, the variable-pitch propeller 12 may activate actuators connected to the variable-pitch propeller blades 16 to move the variable-pitch propeller blades 16 such that the pitch of the variable-pitch propeller blades 16 matches the determined pitch. As an example, the variable-pitch propeller 12 may indicate to the control module 118C using a signal such as an electronic signal that the pitch of the variable-pitch propeller blades 16 has been adjusted to the determined pitch. Alternatively and/or additionally, the control module 118C may monitor the rate of rotation of the variable-pitch propeller 12 to determine whether the rate of rotation meets the initially determined rate of rotation. The control module 118C may further determine whether the initially determined rate of rotation is suitable for generating sufficient mechanical energy to produce electric energy for the energy goal. The control module 118C may utilize a feedback loop process to determine whether the initial or subsequently determined rate of rotation is suitable for generating electric energy. The control module 118C may update or re-determine the rate of rotation based on whether the rate of rotation is suitable for electric energy generation. The control module 118C may also utilize a feedback loop process to determine whether the pitch value is suitable for causing the variable-pitch propeller 12 to rotate at the determined rate of rotation. As such, the control module 118C may receive feedback information from sensor(s) or relevant component(s) such as the variable-pitch propeller(s) 12 and the electric machine(s) 102A, 102B, 102C, 102D to determine or re-determine the rate of rotation and/or the pitch value. The control module 118C may then send the re-determined pitch value.

In a case where the energy goal is bowed rotor motoring, the control module 118C may determine a suitable rate of rotation for one or more of the low-pressure system and the high-pressure system in one or more of the engines 10 of the aircraft so as to dissipate the heat in the engine and even out the temperature within the engine 10. The control module 118C may determine the suitable rate of rotation based on the environment and the characteristics of the aircraft. More specifically, the control module 118C may determine the rate of rotation based on one or more of the environment within the engine 10 such as the temperature within the engine 10, the temperature difference within the engine 10, the temperature of the parts of the engine 10, the temperature difference between the parts of the engine 10, as well as the characteristics of the engine 10.

In one embodiment, the control module 118C includes instructions that, when executed by the processor(s) 118A, cause the processor(s) 118A to, in response to a rotation of the variable-pitch propeller blade 16 about a central axis based on the pitch of the variable-pitch propeller blade 16, transfer electrical energy generated from the rotation to a component. The component may be one or more of a shaft of an engine, an electric battery, and/or a power grid. The electric battery may be a part of the aircraft or may be external to the aircraft. The power grid may be an energy unit that is external to the aircraft.

As the variable-pitch propeller 12 rotates, the low-pressure system and/or the high-pressure system may begin to rotate. As an example, as the low-pressure system rotates and creates kinetic or mechanical energy, the armature in the generator within the electric machine 102A, 102B, 102C, 102D coupled to the low-pressure system also rotates, converting the mechanical energy to electrical energy. As another example, as the high-pressure system rotates and creates kinetic or mechanical energy, the armature in the generator within the electric machine 102A, 102B, 102C, 102D coupled to the high-pressure system also rotates, converting the mechanical energy to electrical energy.

In a case where the energy goal is bowed rotor motoring, the control module 118C may transmit a signal to the electric machine 102A, 102B, 102C, 102D to utilize the generated electric to power the engine 10 such that the variable-pitch propeller 12, the low-pressure system and/or the high-pressure system continue to or begin to rotate, so as to even out the temperature difference within the engine 10 and prevent bowed rotor(s). As such, the electric machine 102A, 102B, 102C, 102D may transfer electric energy to the shaft of the engine 10 such as the shaft 46 of the low-pressure system and/or the shaft 38 of the high-pressure system. The control module 118C may transmit a signal to the electric machine 102A, 102B, 102C, 102D to power the engine 10 that the electric machine 102A, 102B, 102C, 102D is coupled to and/or transfer the generated electric energy to another one or more engines 10 on the aircraft via the power bus 108. In such a case, the control module 118C may transmit a signal to the electric machine 102A, 102B, 102C, 102D to transfer electric energy to the electric storage unit 104 on the aircraft and/or to another electric machine 102A, 102B, 102C, 102D. The control module 118C may then transmit a signal to the other electric machine 102A, 102B, 102C, 102D to power the engine 10 associated with the other electric machine 102A, 102B, 102C, 102D using the transferred electric energy. As such, the control module 118C may activate one or more variable-pitch propellers 12 by adjusting the pitch of the variable-pitch propeller blades 16, and then may generate electric energy as previously described. The control module 118C may then distribute the electric energy to one or more electric machines 102A, 102B, 102C, 102D to power one or more engines 10 on the aircraft such that the associated variable-pitch propeller 12, the low-pressure system and/or the high-pressure system continue to or begin to rotate, so as to even out the temperature difference within the engine 10 and prevent bowed rotor(s). In a case where multiple engines 10 on the aircraft are mechanically coupled to each other, the control module 118C may activate the coupling system such that a first engine 10A being powered by an electric machine 102A, 102B may transfer kinetic energy to another engine 10B such that as the first engine 10A rotates, the other engine 10B also rotates.

In a case where the energy goal is energy storage, the control module 118C may transmit a signal to the electric machine 102A, 102B, 102C, 102D to transfer the generated electric energy to an electric battery and/or a power grid.

In a case where the energy goal is an engine start, the control module 118C may transmit a signal to the electric machine to transfer the generated electric energy to one or more engines. As such, the control module 118C may transmit a signal to an electric machine 102A, 102B, 102C, 102D to transfer electric energy to the engine 10 that includes the variable-pitch propeller 12 and the electric machine 102A, 102B, 102C, 102D so as to start the engine 10. Additionally and/or alternatively, the control module 118C may transmit a signal to the electric machine 102A, 102B to transfer electric energy to a second engine 10B and/or to an electric machine 102C, 102D associated with the second engine 10B to start the second engine 10B. The engine 10A and the second engine 10B may be coupled together electrically and/or mechanically.

In one embodiment, the control module 118C may utilize the generator in the electric machine(s) 102A, 102B, 102C, 102D as an electric brake. In such an embodiment, the generator acts as an electric brake and slows down the speed of the variable-pitch propeller 12 on the LP shaft 46 and recovers the energy in the form of electricity. The electricity may be stored in one or more of the electric machines 102A, 102B, 102C, 102D. The control module 118C may then send a signal to one of the electric machines 102A, 102B, 102C, 102D to power one of the shafts 38, 46 with the generated electricity. As an example, the electricity may be stored in the electric machine 102B, 102D coupled to the HP shaft 38. As such, the control module 118C may send a signal to the electric machine 102A, 102B, 102C, 102D to inject electricity into the HP shaft 38 to initiate the spinning of the HP shaft 38. Upon the HP shaft 38 starting to spin, the control module 118C may then initiate the fuel injection process so as to start the engine 10.

The control module 118C may start the engine 10 using the electrical energy being generated by the generator in response to the rotation of the variable-pitch propeller 12 and/or the LP shaft 46. In such a case, the control module 118C may transfer the electrical energy from the generator and the associated electric machine 102A, 102B, 102C, 102D to the engine 10 and initiate the fuel injection process. However, in a case where the electrical energy being transferred is not sufficient for the engine start, the control module 118C may utilize the generator as an electric brake to generate sufficient electrical energy to start the engine 10.

The control module 118C may utilize, as an example, a sensor to determine the amount of electrical energy being produced as well as the amount of electrical energy being transferred to the engine 10.

FIG. 7 illustrates a flowchart of a method 700 that is associated with one embodiment of generating electric energy from a variable-pitch propeller 12, then transferring and/or utilizing the generated electrical energy. Method 700 will be discussed from the perspective of the controller 116 of FIGS. 3 and 6. While method 700 is discussed in combination with the control module 118C, it should be appreciated that the method 700 is not limited to being implemented within the controller 116 but is instead one example of a system that may implement the method 700.

At 710, the control module 118C determines a pitch value based on at least an energy goal. The energy goal may be one or more of bowed rotor motoring, an engine start, or energy storage. The control module 118C may receive user input indicating the energy goal. As an example, the user input may indicate that the energy goal is bowed rotor motoring, an engine start, or energy storage. Alternatively and/or additionally, the control module 118C may determine the energy goal based on sensor data, environment conditions, aircraft status (such as whether the aircraft is on ground or in the air), and/or characteristics of the aircraft (such as the type of aircraft, the type of engine, etc.). As an example, the control module 118C may receive sensor data indicating that there is temperature difference in the engine 10 that may cause a bowed rotor. In such an example, the control module 118C may set the energy goal to bowed rotor motoring. As another example, the control module 118C may receive a signal indicating that an engine 10 needs to be started or restarted. In response to the signal, the control module 118C may set the energy goal to an engine start. As yet another example, the control module 118C may receive a signal indicating that an electric storage unit 104 is low on electrical energy and requires electrical energy. In response to the signal, the control module 118C may set the energy goal to energy storage.

The control module 118C may utilize an algorithm to determine the pitch value to achieve the energy goal. More generally, the control module 118C may utilize the algorithm to determine the pitch value to achieve a goal. The goal may be maintaining the first engine 10A in an off state or the goal may be an energy goal. An energy goal may be starting an engine such as the first engine 10A and/or the second engine 10B, or bowed rotor motoring.

The control module 118C may determine the pitch value based on the energy goal, the environmental conditions surrounding the aircraft, the status of the aircraft, and/or the characteristics of the aircraft. As an example, the control module 118C may utilize a look up table and/or a feedback loop to determine the pitch value. The control module 118C may determine the same pitch value for multiple variable-pitch propellers 12. Alternatively, the control module 118C may determine different pitch values for each of the multiple variable-pitch propellers 12.

As an example, the energy goal may be to maintain the first engine 10A in an off state. In such an example, the method includes minimizing the drag on the aircraft. As such, the control module 118C determines the pitch value that the pitch of the variable-pitch propeller 12 may be adjusted to minimize or otherwise reduce drag. The control module 118C may determine the minimum drag based on a function of the characteristics of the aircraft and/or the environmental conditions such as airspeed and altitude. Additionally and/or alternatively, the control module 118C may determine the minimum drag using a look-up table that includes the characteristics of the aircraft and/or the environmental conditions. As another example, the control module 118C may determine the current drag by requesting and receiving data from a sensor such as a torque sensor, a pressure sensor, and/or a string gauge. The control module 118C may continuously adjust the pitch value based on feedback that is indicative of the drag. As such, the control module 118C may adjust the pitch value until the sensor(s) show the drag to be at a minimum value. Additionally and/or alternatively, the control module 118C may adjust the pitch value until a sensor, such as a speed sensor, indicates that the variable-pitch propeller is no longer rotating.

As an example, the energy goal may be to start the first engine 10A and/or the second engine 10B. In such an example, the control module 118C may determine an amount of energy required to start the first engine 10A and/or the second engine 10B based on the characteristics of the first engine 10A, the second engine 10B, and/or the aircraft as well as the environmental conditions. The control module 118C may determine a rate of rotation of the low-pressure shaft and/or the high-pressure shaft to generate an amount of energy required to start the first engine 10A and/or the second engine 10B. In such a case, the control module 118C may determine the rate of rotation based on a relationship between the rate of rotation, the characteristics of the engine including the energy requirements of the engine, the characteristics of the aircraft and/or the environmental conditions. The control module 118C may utilize a function, a look-up table and/or a feedback process to make the determination.

As an example, the energy goal may be bowed rotor motoring. In such an example, the control module 118C may determine an amount of energy required to rotate the variable-pitch propeller based on the characteristics of the first engine 10A, the second engine 10B, and/or the aircraft as well as the environmental conditions. The control module 118C may check that the environmental condition of the aircraft being on ground is met for the energy goal being the bowed rotor motoring. The control module 118C may determine the rate of rotation of the low-pressure shaft and/or the high-pressure shaft required to generate the amount of energy required to start and maintain the bowed rotor motoring. In such a case, the control module 118C may determine the rate of rotation based on a relationship between the rate of rotation, the characteristics of the engine including the energy requirements of the engine, the characteristics of the aircraft and/or the environmental conditions. The control module 118C may utilize a function, a look-up table and/or a feedback process to make the determination. For these examples, inputs to the function, the look-up table, and/or the feedback process may include the rate of rotation required, the current rate of rotation, the characteristics of the engine including the energy requirements of the engine, the characteristics of the aircraft and/or the environmental conditions.

At 720, the control module 118C adjusts a pitch of a variable-pitch propeller blade 16 based on the pitch value. More generally, the control module 118C may adjust the pitch of the blades 16 of one or more variable-pitch propellers 12 to a related pitch value. As such, in a case where the pitch value is the same for multiple variable-pitch propellers 12, the control module 118C may transmit a signal to the variable-pitch propellers 12, instructing the variable-pitch propellers 12 to adjust the related blades 16 to the pitch value. Alternatively, in a case where the pitch value is different for the multiple variable-pitch propellers 12, the control module 118C may transmit a signal to the variable-pitch propellers 12, instructing the variable-pitch propellers 12 to adjust the related blades 16 to the associated pitch value. In response to the signal from the control module 118C, the variable-pitch propeller(s) 12 may adjust the pitch of the related blades 16, which may cause the variable-pitch propeller(s) 12 to begin to rotate around a central axis.

At 730, the control module 118C, in response to the rotation of the variable-pitch propeller blades 16 about the central axis based on the pitch of the variable-pitch propeller blades 16, transfers electrical energy generated from the rotation to a component. The component may be one or more of a shaft of an engine 10 and/or an electric storage unit 104 such as an electric battery or a power grid. The shaft of an engine 10 may be the low-pressure shaft 46 and/or the high-pressure shaft 38 of the engine 10 that includes the variable-pitch propeller 12 that is rotating. Additionally and/or alternatively, the shaft of the engine may be the low-pressure shaft 46 and/or the high-pressure shaft 38 of a second engine 10B that is coupled, mechanically, electronically, or otherwise to the engine 10A that includes the variable-pitch propeller 12 that is rotating. As such, the control module 118C may transfer electrical energy to the shaft(s) 38, 46 of the engine 10A and/or the second engine 10B so as to start the engine 10A and/or the second engine 10B as previously disclosed. As previously mentioned, in a case where the control module 118C determines that the electrical energy from the generator is not sufficient to start the engine 10, the control module 118C may activate an electric brake to slow down the rotation of the variable-pitch propeller 12 and/or the shaft(s) 38, 46, thus generating additional electrical energy that can be utilized to power the engine(s) 10 for an engine start.

In a case where the component is an electric storage unit 104, the control module 118C may transmit a signal to the electric machine 102A, 102B to transfer electrical energy to the energy battery and/or the power grid.

Figure 8:
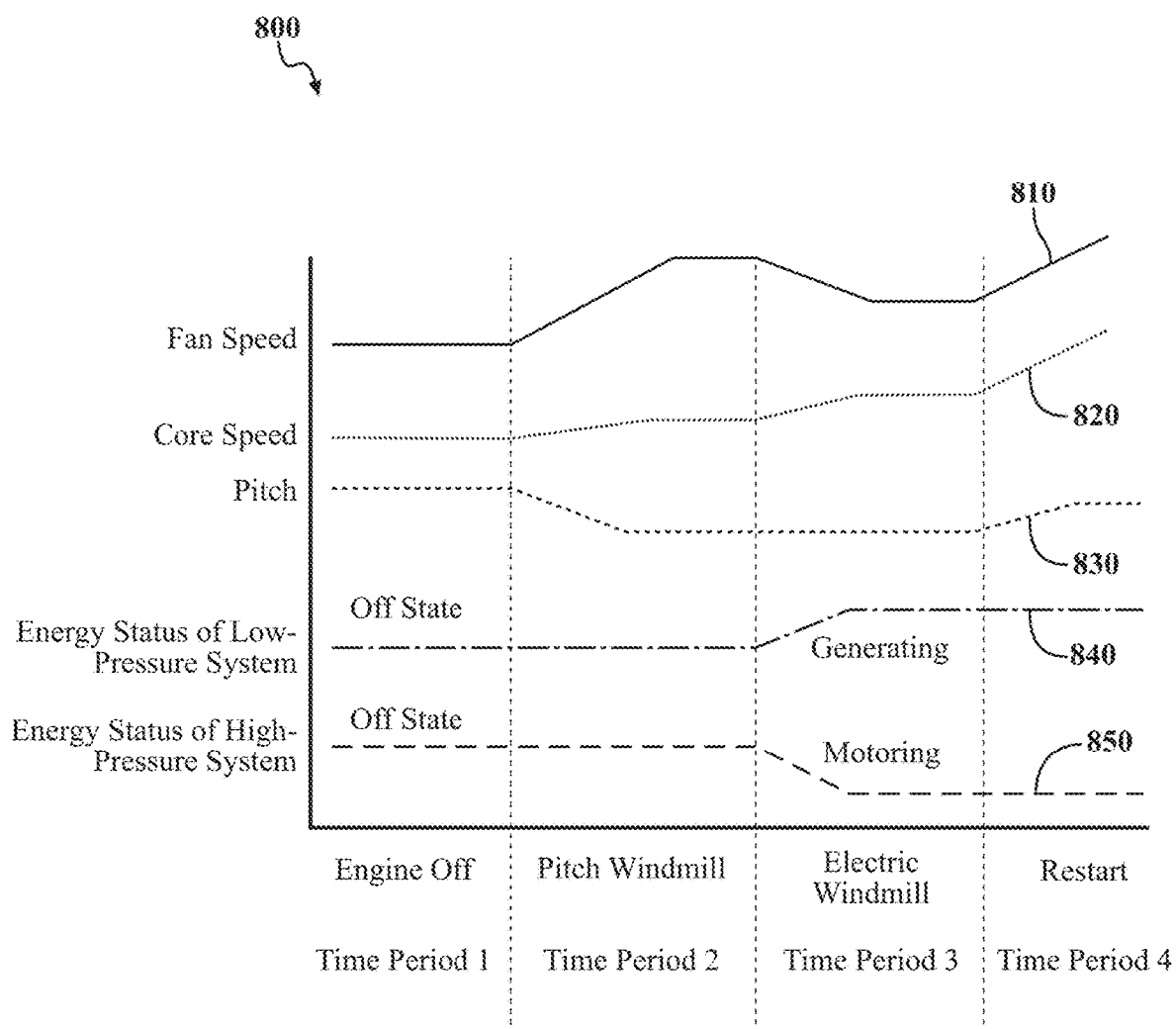
FIG. 8 is a time graph that is associated with one embodiment of generating electric energy from a variable-pitch propeller and starting an engine.

FIG. 8 shows a time graph 800 that is associated with one embodiment of generating electric energy from a variable-pitch propeller 12, then starting the first engine 10A. The time graph 800 includes a speed of rotation 810 of a variable-pitch propeller 16 associated with the first engine 10A, a speed of rotation 820 of a core of the first engine 10A, a pitch value 830 of the variable-pitch propeller 12, an energy status 840 for a low-pressure system, an energy status 850 for a high-pressure system. The variable-pitch propeller 16 is directly connected to the low-pressure system. As such, the speed of rotation 810 of the variable-pitch propeller 16 is the same as the speed of rotation of the low-pressure shaft 46 and low-pressure system. The core of the first engine 10A is also known as the high pressure shaft 38. As such, reference to the speed of rotation 820 of the core is a reference to the speed of rotation of the high pressure shaft 38 and high-pressure system. The low-pressure system generates energy based on the rotation and/or braking of the low pressure shaft. The high-pressure system generates energy based on the rotation and/or braking of the high pressure shaft. The energy status of the low-pressure system and the high-pressure system may be off such that the low-pressure system is not generating energy nor receiving energy and the high-pressure system is not generating energy nor receiving energy. The energy status of either system may be generating energy or receiving energy.

At Time Period 1, the first engine 10A is turned off, the blades 16 of the variable-pitch propeller 12 associated with the first engine 10A are in the feathered position such that there is minimum drag. As such, the variable-pitch propeller 12 is not rotating or rotating at a very low speed. The low-pressure system and the high-pressure system are also not rotating or rotating at a very low speed. As such, the low-pressure system and the high-pressure system are off. The low-pressure system and the high-pressure system are not generating energy nor receiving energy.

At Time Period 2, the control module 118C receives a signal to adjust the pitch value 830. The signal may be an electronic signal based on user input and/or sensor data. The signal may be automatically generated. As the pitch value 830 changes, the speed of rotation 810 of the variable-pitch propeller 16 increases until the speed of rotation reaches a predetermined maximum speed. As the speed of rotation 810 of the variable-pitch propeller 16 increases, the speed of rotation 820 of the core also increases. The speed of rotation 820 of the core may also reach a second predetermined maximum speed. However, the speed of rotation 820 of the core is not sufficient to restart the first engine 10A. In this time period, the energy status of both the low-pressure system and the high-pressure system is off.

At Time Period 3, the control module 118C activates an electric brake that slows down the speed of rotation 810 of the variable-pitch propeller 16. As the variable-pitch propeller 16 slows down, kinetic energy from the variable-pitch propeller 16 is converted into electric energy. As shown, the low-pressure system begins to generate energy as the energy status 840 slopes upwards from the baseline at the off position, indicating energy generation, and the high-pressure system begins to receive energy as the energy status 850 slopes downwards from the baseline at the off position, indicating energy consumption. The energy being generated from the low-pressure system may be transferred directly to the high-pressure system. Alternatively, the energy being generated from the low-pressure system may be transferred to an electric battery, and then transferred from the electric battery to the high-pressure system. As the high-pressure system receives energy, the high-pressure system is motoring and the speed of rotation 820 of the core increases to at least a threshold speed that is sufficient to restart the engine. The control module 118C may activate the electric brake to reduce the speed of the rotation in response to at least one of the speed of rotation reaching a predetermined speed value, user input, or sensor data.

At Time Period 4, the control module 118C then restarts the first engine 10A with the core rotating at at least a threshold speed that is sufficient to restart the engine. At this time, the first engine 10A is on, the speeds of rotation of the variable-pitch propeller 16 and the core may also increase as shown. The electrical energy may be generated from a combination of the rotation of the low-pressure system and the slowing down of the rotation by the electric brake. The electrical energy may be used to start an engine, for bowed rotor motoring, or may be transferred to an electric battery or a power grid.

FIG. 9 shows another flowchart of a method 900 that is associated with one embodiment of generating electric energy from a variable-pitch propeller 12, then transferring and/or utilizing the generated electrical energy. More specifically, the method 900 illustrates an example of the decision-making process used to determine the energy goal and the actions associated with the determined energy goal.

At 910, the control module 118C may receive user input indicating the energy goal. As an example, the user input may indicate the energy goal is an engine start for a first engine 10A, an engine start for a second engine 10B (or more generally, another engine), bowed rotor motoring, energy storage onboard in an electric battery 104A, 104B, or energy storage offboard in a power grid. Additionally and/or alternatively, the control module 118C may receive sensor data and/or status information relating to one or more components on the aircraft.

At 915, the control module 118C determines whether electrical energy is to be transferred to an engine shaft based on the sensor data, the status information, and/or the user input. If yes, electrical energy is to be transferred to an engine shaft, the control module 118C proceeds to 920. If no, electrical energy is not to be transferred to an engine shaft, the control module 118C proceeds to 955.

At 920, the control module 118C further determines whether an engine start is being requested based on the sensor data, the status information, and/or the user input. If yes, an engine start is being requested, the control module 118C proceeds to 925. If no, an engine start is not being requested, the control module 118C proceeds to 940.

At 925, the control module 118C determines whether the engine start is a cross-engine start based on the sensor data, the status information, and/or the user input. If yes, the engine start is a cross-engine start, the control module 118C proceeds to 930. If no, the engine start is not a cross-engine start, the control module 118C proceeds to 935.

At 930, the control module 118C proceeds to start a second engine 10B. More generally, the control module 118C proceeds to start an engine 10B other than a first engine 10A. The first engine 10A being the engine that includes the variable-pitch propeller 12 that is rotating and generating electric energy. The control module 118C may start the other one or more engines 10B using any of the processes previously described.

At 935, the control module 118C proceeds to start the first engine 10A using any of the processes described above.

At 940, the control module 118C determines whether bowed rotor motoring is required based on the sensor data, the status information, and/or the user input. If yes, bowed rotor motoring is required, the control module 118C proceeds to 945. If no, bowed rotor motoring is not required, the control module 118C proceeds to 950.

At 945, the control module 118C identifies which engines 10 require bowed rotor motoring and initiates the bowed rotor motoring process as detailed above.

At 950, the control module 118C may not issue any command and the blades 16 of the variable-pitch propeller(s) 12 may remain in their current position. As an example, the variable-pitch propeller blades 16 may remain in the feathered position.

At 955, the control module 118C may determine whether electric power storage is being requested based on the sensor data, the status information, and/or the user input. If yes, electric power storage is being requested, the control module 118C proceeds to 960. If no, electric power storage is not being requested, the control module 118C proceeds to 950.

At 960, the control module 118C may determine whether onboard electric power storage 104 is being requested based on the sensor data, the status information, and/or the user input. If yes, onboard electric power storage 104 is being requested, the control module 118C proceeds to 965. If no, onboard electric power storage 104 is not being requested, the control module 118C proceeds to 970.

At 965, the control module 118C determines that the energy goal is energy storage in an electric battery 104 and then begins the process of generating and transferring electrical energy to the electric battery 104 located on the aircraft as described above.

At 970, the control module 118C determines that the energy goal is energy storage in a power grid and then begins the process of generating and transferring electrical energy to a power grid as described above.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC)

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Aspects herein can be embodied in other forms without departing from the spirit or essential attributes thereof. Accordingly, reference should be made to the following claims, rather than to the foregoing specification, as indicating the scope hereof.

Restarting the engine(s) of an aircraft may include utilizing an external power source such as an Auxiliary Power Unit (APU), which requires acquiring and maintaining the external power source on the aircraft. Preventing a bowed rotor using bowed rotor motoring also requires an external power source to power the variable-pitch propeller such that the variable-pitch propeller rotates at a low speed and dissipates the heat within the engine, as an example.

Accordingly, systems, methods, and other embodiments associated with restarting an aircraft engine, performing bowed rotor motoring, and/or generating electrical power using at least one of a variable-pitch propeller and an electric brake are disclosed.

As previously mentioned, the embodiments disclosed herein have various advantages over conventional technologies. First, the embodiments are capable of restarting an engine using a combination of the low-pressure system and an electric brake such that restarting the engine is not dependent on the speed of rotation of the low-pressure system alone. Second, the embodiments are capable of restarting an engine without an external power source. Third, the embodiments are capable of generating and transferring electrical power from one engine to another engine. Fourth, the embodiments are capable of preventing a bowed rotor by performing bowed rotor motoring without using an external power source. Fifth, the embodiments are capable of generating and transmitting electrical energy to onboard electrical storage units and/or offboard electrical storage units.

Further aspects are provided by the subject matter of the following clauses.

A method comprising determining a pitch value based on at least an energy goal, adjusting a pitch of a plurality of variable-pitch propeller blades based on the pitch value, and in response to a rotation of the plurality of variable-pitch propeller blades about a central axis based on the pitch of the plurality of variable-pitch propeller blades, transferring electrical energy generated from the rotation to a component. The plurality of variable-pitch propeller blades are part of a variable-pitch propeller.

The method according to any of the preceding clauses, wherein the component is one of a shaft of an engine, an electric battery, or a power grid.

The method according to any of the preceding clauses, wherein the energy goal is at least one of bowed rotor motoring, an engine start, or energy storage.

The method according to any of the preceding clauses, wherein the engine start is for starting at least one of a turbo engine or a second turbo engine. The turbo engine includes the variable-pitch propeller, and the second turbo engine is coupled to the turbo engine.

The method according to any of the preceding clauses, wherein determining the pitch value is based on at least one of environmental conditions or characteristics of an aircraft. The aircraft includes a turbo engine, and the turbo engine includes the variable-pitch propeller.

The method according to any of the preceding clauses, further comprising determining whether the electrical energy being transferred is sufficient for an engine start and in response to the electrical energy not being sufficient for the engine start, activating an electric brake to assist in the engine start.

The method according to any of the preceding clauses, wherein determining the pitch value is in response to at least one of user input or sensor data.

A system comprises a variable-pitch propeller, a processor, and a memory. The variable-pitch propeller includes a plurality of variable-pitch propeller blades. The memory stores machine-readable instructions that, when executed by the processor, cause the processor to determine a pitch value based on at least an energy goal, adjust a pitch of the plurality of variable-pitch propeller blades based on the pitch value, and in response to a rotation of the plurality of variable-pitch propeller blades about a central axis based on the pitch of the plurality of variable-pitch propeller blades, transfer electrical energy generated from the rotation to a component.

The system according to any of the preceding clauses, wherein the component is one of a shaft of an engine, an electric battery, or a power grid.

The system according to any of the preceding clauses, wherein the energy goal is at least one of bowed rotor motoring, an engine start, or energy storage.

The system according to any of the preceding clauses, wherein the engine start is for starting at least one of a turbo engine or a second turbo engine. The turbo engine includes the variable-pitch propeller, and the second turbo engine is coupled to the turbo engine.

The system according to any of the preceding clauses, wherein the machine-readable instructions further include instructions that when executed by the processor cause the processor to determine the pitch value based on at least one of environmental conditions or characteristics of an aircraft. The aircraft includes a turbo engine, and the turbo engine includes the variable-pitch propeller.

The system according to any of the preceding clauses, wherein the machine-readable instructions further include instructions that when executed by the processor cause the processor to determine whether the electrical energy being transferred is sufficient for an engine start, and in response to the electrical energy not being sufficient for the engine start, activate an electric brake to assist in the engine start.

The system according to any of the preceding clauses, wherein the machine-readable instructions further include instructions that when executed by the processor cause the processor to determine the pitch value is in response to at least one of user input or sensor data.

A non-transitory computer-readable medium includes instructions that when executed by a processor cause the processor to determine a pitch value based on at least an energy goal, adjust a pitch of a plurality of variable-pitch propeller blades based on the pitch value and in response to a rotation of the plurality of variable-pitch propeller blades about a central axis based on the pitch of the plurality of variable-pitch propeller blades, transfer electrical energy generated from the rotation to a component. The plurality of variable-pitch propeller blades is part of a variable-pitch propeller.

The non-transitory computer-readable medium according to any of the preceding clauses, wherein the component is one of a shaft of an engine, an electric battery, or a power grid.

The non-transitory computer-readable medium according to any of the preceding clauses, wherein the energy goal is at least one of bowed rotor motoring, an engine start, or energy storage.

The non-transitory computer-readable medium according to any of the preceding clauses, wherein the engine start is for starting at least one of a turbo engine or a second turbo engine. The turbo engine includes the variable-pitch propeller, and the second turbo engine is coupled to the turbo engine.

The non-transitory computer-readable medium according to any of the preceding clauses, wherein the instructions further include instructions that when executed by the processor cause the processor to determine the pitch value based on at least one of environmental conditions or characteristics of an aircraft. The aircraft includes a turbo engine, and the turbo engine includes the variable-pitch propeller.

The non-transitory computer-readable medium according to any of the preceding clauses, wherein the instructions further include instructions that when executed by the processor cause the processor to determine whether the electrical energy being transferred is sufficient for an engine start, and in response to the electrical energy not being sufficient for the engine start, activate an electric brake to assist in the engine start.

What is claimed is:

1. A method comprising:
   receiving an indication of an energy goal, the energy goal being at least one of a bowed rotor motoring, an engine start for a first engine, an engine start for a second engine, energy storage onboard in an electric battery, or energy storage offboard in a power grid;
   in response to receiving the indication of the energy goal that is the bowed rotor motoring:
      identifying either the first engine or the second engine associated with the bowed rotor motoring; and
      causing a first electrical energy to be transferred to a first shaft associated with the identified engine;
   in response to receiving the indication of the energy goal that is the engine start for the first engine, causing a second electrical energy to be transferred to the first engine;
   in response to receiving the indication of the energy goal that is the engine start for the second engine, causing a third electrical energy to be transferred to the second engine;
   in response to receiving the indication of the energy goal that is energy storage onboard in the electric battery:
      generating a fourth electrical energy; and
      transferring the generated fourth electrical energy to the electrical battery; and
   in response to receiving the indication of the energy goal that is energy storage offboard in the power grid:
      generating a fifth electrical energy; and
      transferring the generated fifth electrical energy to the power grid;
   determining a pitch value based on at least the energy goal;
   adjusting a pitch of a plurality of variable-pitch propeller blades based on the pitch value, the plurality of variable-pitch propeller blades being part of a variable-pitch propeller; and
   in response to receiving the indication of the energy goal that is one or more of the bowed rotor motoring, the engine start for the first engine, or the engine start for the second engine:
      in response to a rotation of the plurality of variable-pitch propeller blades about a central axis based on the pitch of the plurality of variable-pitch propeller blades, activating an electric brake to reduce a speed of the rotation; and
      transferring a sixth electrical energy generated by the electric brake reducing the speed of the rotation to a component.

2. The method of claim 1, wherein the component is one of:
   a second shaft of a third engine;
   the electric battery; or
   the power grid.

3. The method of claim 1, wherein activating the electric brake to reduce the speed of the rotation is in response to at least one of:
   the speed of rotation reaching a predetermined speed value;
   user input; or
   sensor data.

4. The method of claim 1, wherein the engine start is for starting at least one of:
   a turbo engine, wherein the turbo engine includes the variable-pitch propeller; or
   a second turbo engine, wherein the second turbo engine is coupled to the turbo engine.

5. The method of claim 1, wherein determining the pitch value is based on at least one of:
   environmental conditions; or
   characteristics of an aircraft, wherein the aircraft includes a turbo engine, and the turbo engine includes the variable-pitch propeller.

6. The method of claim 1, further comprising:
   generating the sixth electrical energy from the rotation.

7. The method of claim 1, wherein determining the pitch value is in response to at least one of:
   user input; or
   sensor data.

8. A system, comprising:
   a variable-pitch propeller, the variable-pitch propeller includes a plurality of variable-pitch propeller blades;
   a processor;
   a non-transitory memory storing machine-readable instructions that, when executed by the processor, cause the processor to:
      receive an indication of an energy goal, the energy goal being at least one of a bowed rotor motoring, an engine start for a first engine, an engine start for a second engine, energy storage onboard in an electric battery, or energy storage offboard in a power grid;
      in response to receiving the indication of the energy goal that is the bowed rotor motoring:
         identify either the first engine or the second engine associated with the bowed rotor motoring; and
         cause a first electrical energy to be transferred to a shaft associated with the identified engine;
      in response to receiving the indication of the energy goal that is the engine start for the first engine, cause a second electrical energy to be transferred to the first engine;
      in response to receiving the indication of the energy goal that is the engine start for the second engine, cause a third electrical energy to be transferred to the second engine;
      in response to receiving the indication of the energy goal that is energy storage onboard in the electric battery:
         generate a fourth electrical energy; and
         transfer the generated fourth electrical energy to the electrical battery; and
      in response to receiving the indication of the energy goal that is energy storage offboard in the power grid:
         generate a fifth electrical energy; and
         transfer the generated fifth electrical energy to the power grid;
      determine a pitch value based on at least the energy goal;
      adjust a pitch of the plurality of variable-pitch propeller blades based on the pitch value; and
      in response to receiving the indication of the energy goal that is one or more of the bowed rotor motoring, the engine start for the first engine, or the engine start for the second engine:
         in response to a rotation of the plurality of variable-pitch propeller blades about a central axis based on the pitch of the plurality of variable-pitch propeller blades, activate an electric brake to reduce a speed of the rotation; and
         transfer a sixth electrical energy generated by the electric brake reducing the speed of the rotation to a component.

9. The system of claim 8, wherein the component is one of:
a second shaft of a third engine;
the electric battery; or
the power grid.

10. The system of claim 8, wherein the machine-readable instructions further include instructions that when executed by the processor cause the processor to:
activate the electric brake to reduce the speed of the rotation in response to at least one of:
the speed of rotation reaching a predetermined speed value;
user input; or
sensor data.

11. The system of claim 8, wherein the engine start is for starting at least one of:
a turbo engine, wherein the turbo engine includes the variable-pitch propeller; or
a second turbo engine, wherein the second turbo engine is coupled to the turbo engine.

12. The system of claim 8, wherein the machine-readable instructions further include instructions that when executed by the processor cause the processor to:
determine the pitch value based on at least one of:
environmental conditions; or
characteristics of an aircraft, wherein the aircraft includes a turbo engine, and the turbo engine includes the variable-pitch propeller.

13. The system of claim 8, wherein the machine-readable instructions further include instructions that when executed by the processor cause the processor to: generate the sixth electrical energy from the rotation.

14. The system of claim 8, wherein the machine-readable instructions further include instructions that when executed by the processor cause the processor to:
determine the pitch value is in response to at least one of:
user input; or
sensor data.

15. A non-transitory computer-readable medium including instructions that, when executed by a processor, cause the processor to:
receive an indication of an energy goal, the energy goal being at least one of a bowed rotor motoring, an engine start for a first engine, an engine start for a second engine, energy storage onboard in an electric battery, or energy storage offboard in a power grid;
in response to receiving the indication of the energy goal that is the bowed rotor motoring:
identify either the first engine or the second engine associated with the bowed rotor motoring; and
cause a first electrical energy to be transferred to a shaft associated with the identified engine;
in response to receiving the indication of the energy goal that is the engine start for the first engine, cause a second electrical energy to be transferred to the first engine;
in response to receiving the indication of the energy goal that is the engine start for the second engine, cause a third electrical energy to be transferred to the second engine;
in response to receiving the indication of the energy goal that is energy storage onboard in the electric battery:
generate a fourth electrical energy; and
transfer the generated fourth electrical energy to the electrical battery; and
in response to receiving the indication of the energy goal that is energy storage offboard in the power grid:
generate a fifth electrical energy; and
transfer the generated fifth electrical energy to the power grid;
determine a pitch value based on at least the energy goal;
adjust a pitch of a plurality of variable-pitch propeller blades based on the pitch value, the plurality of variable-pitch propeller blades being part of a variable-pitch propeller; and
in response to receiving the indication of the energy goal that is one or more of the bowed rotor motoring, the engine start for the first engine, or the engine start for the second engine:
in response to a rotation of the plurality of variable-pitch propeller blades about a central axis based on the pitch of the plurality of variable-pitch propeller blades, activate an electric brake to reduce a speed of the rotation; and
transfer a sixth electrical energy generated by the electric brake reducing the speed of the rotation to a component.

16. The non-transitory computer-readable medium of claim 15, wherein the component is one of:
a second shaft of a third engine;
the electric battery; or
the power grid.

17. The non-transitory computer-readable medium of claim 15, wherein the instructions include instructions to activate the electric brake to reduce the speed of the rotation in response to at least one of:
the speed of rotation reaching a predetermined speed value;
user input; or
sensor data.

18. The non-transitory computer-readable medium of claim 15, wherein the engine start is for starting at least one of:
a turbo engine, wherein the turbo engine includes the variable-pitch propeller; or
a second turbo engine, wherein the second turbo engine is coupled to the turbo engine.

19. The non-transitory computer-readable medium of claim 15, wherein the instructions include instructions to determine the pitch value based on at least one of:
environmental conditions; or
characteristics of an aircraft, wherein the aircraft includes a turbo engine, and the turbo engine includes the variable-pitch propeller.

20. The non-transitory computer-readable medium of claim 15, wherein the instructions include instructions to generate the sixth electrical energy from the rotation.

* * * * *